000

United States Patent
Akkary et al.

(10) Patent No.: US 9,262,173 B2
(45) Date of Patent: Feb. 16, 2016

(54) CRITICAL SECTION DETECTION AND PREDICTION MECHANISM FOR HARDWARE LOCK ELISION

(75) Inventors: Haitham Akkary, Portland, OR (US); Ravi Rajwar, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 13/350,572

(22) Filed: Jan. 13, 2012

(65) Prior Publication Data

US 2012/0117333 A1 May 10, 2012

Related U.S. Application Data

(62) Division of application No. 11/599,009, filed on Nov. 13, 2006, now Pat. No. 8,190,859.

(51) Int. Cl.
*G06F 9/52* (2006.01)
*G06F 9/38* (2006.01)
*G06F 9/30* (2006.01)

(52) U.S. Cl.
CPC ............ *G06F 9/3865* (2013.01); *G06F 9/3004* (2013.01); *G06F 9/30087* (2013.01); *G06F 9/3834* (2013.01); *G06F 9/3842* (2013.01); *G06F 9/528* (2013.01)

(58) Field of Classification Search
None
See application file for complete search history.

(56) References Cited

U.S. PATENT DOCUMENTS

| 7,120,762 | B2 | 10/2006 | Rajwar et al. |
| 7,366,831 | B2 | 4/2008 | Saha et al. |
| 7,500,087 | B2 | 3/2009 | Saha |
| 7,516,313 | B2 | 4/2009 | Saha et al. |
| 7,529,914 | B2 | 5/2009 | Saha et al. |
| 2003/0079094 | A1 | 4/2003 | Rajwar et al. |
| 2006/0015701 | A1 | 1/2006 | Hogenauer |

(Continued)

OTHER PUBLICATIONS

Ravi Rajwar. "Speculation-Based Techniques for Transactional Lock-Free Execution of Lock-Based Programs" Dissertation for the degree of Doctor of Philosophy (Computer Sciences) at the University of Wisconsin—Madison. 2002.*

(Continued)

*Primary Examiner* — Jacob A Petranek
(74) *Attorney, Agent, or Firm* — Nicholson De Vos Webster & Elliott LLP

(57) ABSTRACT

A method and apparatus for detecting lock instructions and lock release instruction, as well as predicting critical sections is herein described. A lock instruction is detected with detection logic, which potentially resides in decode logic. A lock instruction entry associated with the lock instruction is stored/created. Address locations and values to be written to those address location of subsequent potential lock release instruction are compared to the address loaded from by the lock instruction and the value load by the lock instruction. If the addresses and values match, it is determined that the lock release instruction matches the lock instruction. A prediction entry stores a reference to the lock instruction, such as a last instruction pointer (LIP), and an associated value to represent the lock instruction is to be elided upon subsequent detection, if it is determined that the lock release instruction matches the lock instruction.

12 Claims, 6 Drawing Sheets

(56) References Cited

U.S. PATENT DOCUMENTS

| | | |
|---|---|---|
| 2006/0053351 A1* | 3/2006 | Anderson et al. ............. 714/100 |
| 2006/0161740 A1 | 7/2006 | Kottapalli et al. |
| 2006/0294326 A1 | 12/2006 | Jacobson et al. |
| 2007/0006186 A1 | 1/2007 | Johnson et al. |
| 2007/0136289 A1 | 6/2007 | Adl-Tabatabai et al. |
| 2007/0143287 A1 | 6/2007 | Adl-Tabatabai et al. |
| 2007/0186056 A1 | 8/2007 | Saha et al. |
| 2007/0234326 A1 | 10/2007 | Kejariwal et al. |
| 2008/0005504 A1 | 1/2008 | Barnes et al. |
| 2008/0065864 A1 | 3/2008 | Akkary et al. |
| 2009/0119459 A1* | 5/2009 | Akkary et al. ................. 711/130 |
| 2012/0144126 A1* | 6/2012 | Nimmala et al. ............. 711/141 |

OTHER PUBLICATIONS

Jerry M. Rosenberg, "Dictionary of Computers, Information Processing & Telecommunications", 2nd edition, John Wiley & Sons, 1987, p. 698.

Ravi Rajwar, "Speculation-Based Techniques for Transactional Lock-Free Execution of Lock-Based Programs", Doctoral Dissertation, University of Wisconsin at Madison, 2002.

Rajwar et al., "Speculative Lock Elision: Enabling Highly Concurrent Multithreaded Execution", Proceedings of the 34th International Symposium on Microarchitecture, IEEE, Dec. 3-5, 2001, Austin, Texas.

Office Action Received for Chinese Patent Application No. 200710186451.9, mailed on Dec. 12, 2008, 6 Pages of Office Action and 3 pages of english Translation.

Office Action Received for Chinese Patent Application No. 200710186451.9, mailed on Nov. 1, 2011, 3 Pages of Office Action and 5 pages of english Translation.

Office Action Received for Chinese Patent Application No. 200710186451.9, mailed on Jun. 5, 2012, 3 Pages of Office Action and 5 pages of English Translation.

"Intel® 64 and IA-32 Architectures Software Developer's Manual" Instruction Set Reference, A-M, vol. 2A, May 2011, 832 pages.

"Intel® 64 and IA-32 Architectures Software Developer's Manual" Instruction Set Reference, N-Z, vol. 2B, Sep. 2006, 612 pages.

Office Action Received for German Patent Application No. 102007054057.6 mailed on Feb. 21, 2013, 9 pages of Office Action and 9 pages of English translation.

* cited by examiner

Storage logic 136

| LI Str PA 205 | LI LD Value 210 | LI LD Size 215 | LI Str Value 220 | LI Str Size 225 | uOP Count 230 | Release Flag 235 | Late Lock Flag 240 | LIP 245 |
|---|---|---|---|---|---|---|---|---|
| 250 | | | | | | | | |
| 260 | | | | | | | | |
| 270 | | | | | | | | |
| 280 | | | | | | | | |

CRITICAL SECTION DETECTION AND PREDICTION MECHANISM FOR HARDWARE LOCK ELISION

CROSS REFERENCE TO RELATED APPLICATIONS

The present application is a divisional of now pending U.S. patent application Ser. No. 11/599,009, entitled "A CRITICAL SECTION DETECTION AND PREDICTION MECHANISM FOR HARDWARE LOCK ELISION" filed on Nov. 13, 2006 and claims priority there from.

FIELD

This invention relates to the field of processor execution and, in particular, to execution and elision of locks.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more threads to be executed. However, the increase in the number of threads that may be executed simultaneously has created problems with synchronizing data shared among the threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

BRIEF DESCRIPTION OF THE DRAWINGS

The present invention is illustrated by way of example and not intended to be limited by the figures of the accompanying drawings.

FIG. 2 illustrates an embodiment of storage logic to store lock instruction entries (LIEs).

FIG. 5a illustrates an embodiment of a flow diagram for detecting critical sections and predicting critical sections to perform hardware lock elision on.

FIG. 5b illustrates the rest of the flow diagram illustrated in FIG. 5a.

DETAILED DESCRIPTION

In the following description, numerous specific details are set forth such as examples of specific hardware support for storing lock instruction entries/prediction entries, specific storage logic organization, specific processor organization, and specific types of lock/lock release instructions, etc. in order to provide a thorough understanding of the present invention. It will be apparent, however, to one skilled in the art that these specific details need not be employed to practice the present invention. In other instances, well known components or methods, such as lock programming, detecting opcodes/instructions, specific processor architectures, tracking of tentative memory accesses, register checkpointing, and specific operational details of microprocessors, have not been described in detail in order to avoid unnecessarily obscuring the present invention.

The method and apparatus described herein are for detecting critical sections and performing hardware lock elision (HLE) on predicted critical sections. Specifically, the detection and performance of HLE is primarily discussed in reference to a microprocessor to illustrate basic operation. However, the methods and apparatus for detecting critical sections and performing HLE are not so limited, as they may be implemented on or in association with any integrated circuit device or system, such as cell phones, personal digital assistants, embedded controllers, mobile platforms, desktop platforms, and server platforms, as well as in conjunction with other execution techniques, such as locks, transactional execution, speculative execution, in-order execution, and out-of-order execution.

Figure 1:
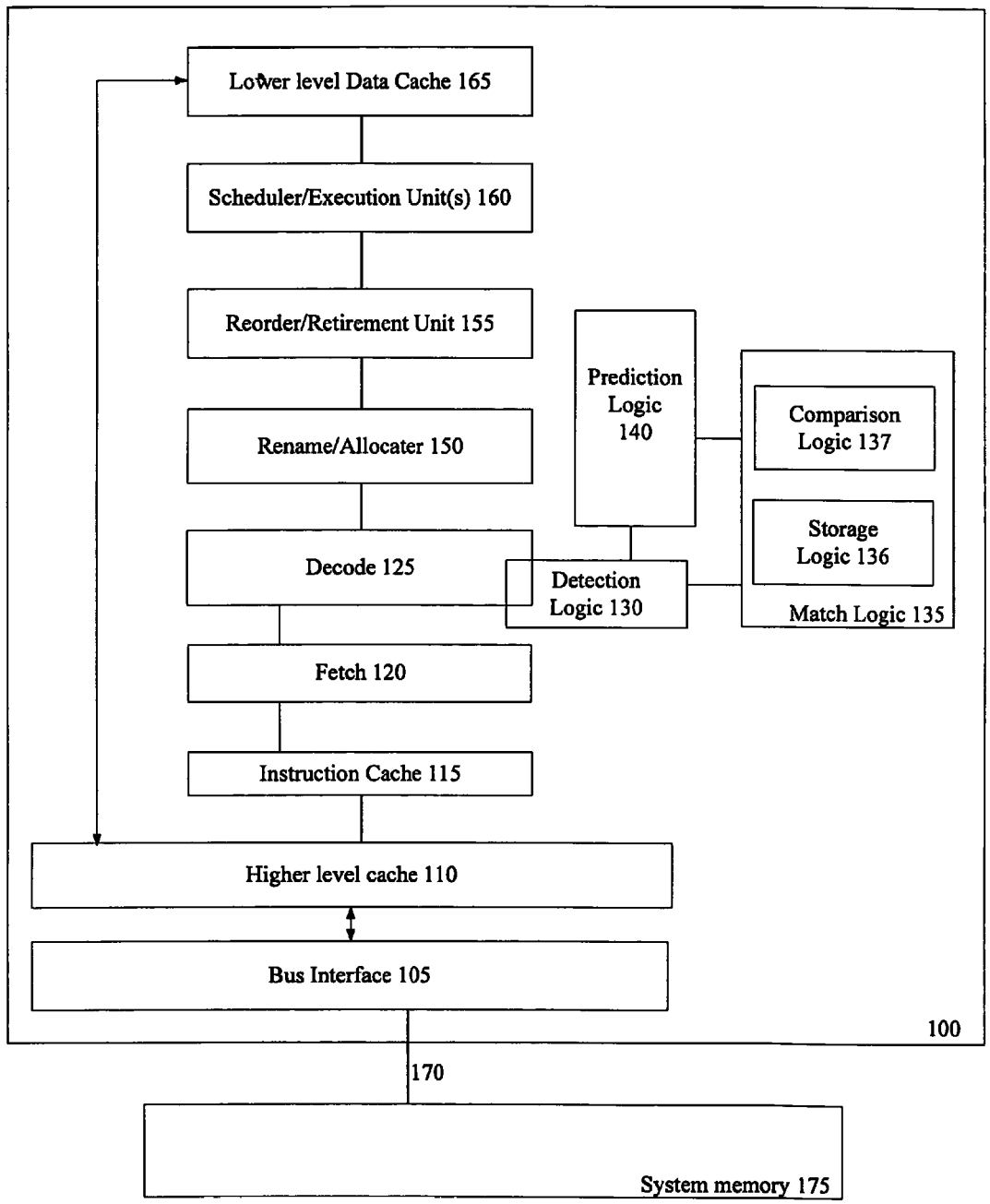
FIG. 1 illustrates an embodiment a processor capable of detecting and predicting critical sections.

Referring to FIG. 1, an embodiment of a processor capable of detecting and predicting critical sections is illustrated. In one embodiment, processor 100 is a multi-core processor capable of executing multiple threads in parallel. However processor 100 may including any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1. Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage.

Bus interface unit 105 is to communicate with device external to processor 100, such as system memory 175, a chipset, a northbridge, or other integrated circuit. Typically bus interface unit 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125.

Here, instruction cache 115 stores recently fetched instructions that have not been decoded. Yet, instruction cache 115 is potentially placed after fetch logic 120 and/or after decode logic 125 to store decoded instructions Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches.

Decode logic 125 is coupled to fetch logic 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed. As a result, in one embodiment, detection logic 130, which is capable of detecting lock instructions and lock release instructions, is at least partially included in decode logic 125. In other embodiments, detection logic 130 is fully included in decode logic 125 or fully external to decode logic 125.

As stated above, detection logic 130 is capable of detecting lock instructions and subsequent lock release instructions. In one embodiment, explicit lock or lock release instructions are utilized. For example, in Intel's current IA-32 and Intel® 64 instruction set an Assert Lock# Signal Prefix, which has opcode F0, may be prepended to some instructions to ensure exclusive access of a processor to a shared memory. The Intel IA-32 and Intel® 64 instruction set is described in Intel® 64 and IA-32 Architectures Software Developer's Manual, Volume 2A: Instruction Set Reference, A-M and Volume 2B: Instruction Set Reference, N-Z, which is located at http://www.intel.com/design/pentium4/manuals/index_new.htm#1. However, programmers typically utilize address locations as meta-data or locks for locations as a construct of software.

For example, a programmer using a first address location as a lock/meta-data for a first hash table sets the value at the first address location to a first logical state, such as zero, to represent that the hash table may be accessed, i.e. unlocked. Upon a thread of execution entering the hash table, the value at the first address location will be set to a second logical value, such as a one, to represent that the first hash table is locked. Consequently, if another thread wishes to access the hash table, it previously would wait until the lock is reset by the first thread to zero. As a simplified illustrative example of an abstracted lock, a conditional statement is used to allow access by a thread to a section of code or locations in memory, such as if lock_variable is the same as 0, then set the lock_variable to 1 and access locations within the hash table associated with the lock_variable.

Therefore, in one embodiment, detection of a lock instruction by detection logic 130 includes detection of a predetermined lock instruction(s) and/or a grouping of operations that include a load from an address location, i.e. checking if the lock is available, and a modify/write to the address location, i.e. an update to the address location to set the lock. A few examples of instructions that may be used as lock instructions include a compare and exchange instruction, a bit test and set instruction, and an exchange and add instruction. In Intel's IA-32 and IA-64 instruction set, the aforementioned instructions include CMPXCHG, BTS, and XADD, as described in Intel® 64 and IA-32 instruction set documents discussed above.

As an example, where predetermined instructions, such as CMPXCHG, BTS, and XADD are detected/recognized, detection logic 130 and/or decode logic 125 detects the instructions utilizing an opcode field or other field of the instruction. As an example, CMPXCHG is associated with the following opcodes: 0F B0/r, REX+0F B0/r, and REX.W+0F B1/r. In another embodiment, operations associated with an instruction are utilized to detect a lock instruction. For example, in x86 the following three memory micro-operations are used to perform an atomic memory update of a memory location indicating a potential lock instruction: (1) Load_Store_Intent (L_S_I) with opcode 0x63; (2) STA with opcode 0x76; and (3) STD with opcode 0x7F. Here, L_S_I obtains the memory location in exclusive ownership state and does a read of the memory location, while the STA and STD operations modify and write to the memory location. In other words, the lock value at the memory location is read, modified, and then a new modified value is written back to the location. Note that lock instructions may have any number of other non-memory, as well as other memory, operations associated with the read, write, modify memory operations.

In addition, in one embodiment, a lock release instruction is a predetermined instruction or group of instructions/operations. However, just as lock instructions may read and modify a memory location, a lock release instruction may only modify/write to a memory location. As a consequence, in one embodiment, any store/write operation is potentially a lock-release instruction. As stated above, instructions and stores may be identified by opcode or any other known method of detecting instructions/operations.

Match logic 135 is coupled to detection logic 130. Match logic is to determine if a lock instruction begins a critical section. In other words, whether a lock release instruction corresponds to a lock instruction. Here, when a lock instruction and a lock release instruction are a matching pair, i.e. correspond, it is said that the lock instruction and the lock release instruction define a critical section (CS). A critical section typically includes a plurality of operations to be atomically executed. Therefore, a critical section is also often referred to as an atomic section, or potentially any reference to a grouped section of code.

In one embodiment, a subsequent lock release instruction corresponding to a lock instruction includes: an addresses referenced by the subsequent lock release instruction and an address referenced by the lock instruction matching, as well as a value to be written by the lock release instruction and a value loaded by the lock instruction matching.

For example, assume a memory location 0x00 stores a logical zero to represent a hash table is not locked. Upon encountering a lock instruction, the lock instruction is associated with or includes a load/read operation to read the logical zero from location 0x00 to ensure the lock is available. Since the memory location is a zero, the lock is available, and a store associated with the lock instruction is to write a logical one to location 0x00 to lock the hashtable. In one embodiment, the store to location 0x00 associated with the lock instruction is elided. Elision will be discussed in more detail below.

Upon detecting a subsequent lock release instruction, which for this example is a store operation, the address referenced by the store is compared to address location 0x00 referenced by the read of the lock instruction. If the store operation is to another address, such as 0x0A, then the store operation is determined not to be a corresponding lock release instruction, i.e. the store is writing to an address location other than the location of the lock. Yet, if the store references 0x00 and is to write a value of zero to location 0x00, then it is a corresponding lock release instruction, as it is attempting to return the lock value at the same address location from a logical one, i.e. locked, to a logical zero, i.e. unlocked state. Once again, if the lock instruction was elided, then the lock value was not modified to a one and the lock release store may also be elided to avoid rewriting a logical zero to location 0x00.

Although the example above includes matching both address locations and values to determine the instructions correspond, matching a lock instruction to a lock release instruction is not so limited. For example, in one embodiment of a lock, a locked state is represented by any odd integer, while an unlocked state is represented by an even integer. Here, a corresponding lock release instruction references the same address, but potentially stores a different value than the value read by the lock instruction. To illustrate, assume the lock value is a zero, i.e. unlocked. The lock instruction reads the zero and is to store a one, i.e. locked. A corresponding lock release instruction potentially stores a zero or a two, depending on the implementation, to release the lock. As a result, any known method of matching a lock release to a lock may be used, such as matching referenced addresses.

In processor 100, match logic 135 includes storage logic 136 and comparison logic 137. Storage logic 136 is to store a lock instruction entry (LIE). In response to detecting a lock instruction, an LIE is created/stored in storage logic 135. In one embodiment, each LIE includes a reference to a detected lock instruction associated with an address location referenced by the lock instruction. In another embodiment, each LIE also includes the value read by the associated lock instruction. Later, when a lock release instruction is detected, the information stored in a LIE is compared to the lock release instruction information to determine the lock and lock release instructions correspond.

In this example, comparison logic 137 is to determine if a subsequent lock release instruction corresponds to a lock instruction. In one embodiment, comparison logic 137 compares a reference to an address stored in a LIE in storage logic 136, with an address referenced by the lock release instruction. If the address locations are the same, then comparison logic 137 determines that the subsequent lock release instruction corresponds/matches the lock instruction referenced in the LIE. In another embodiment, the comparison logic also compares a value to be written by the subsequent lock release instruction and the value read from the address location referenced by the lock instruction, which is stored in the LIE. Here, it is determined that that the subsequent lock release instruction corresponds/matches the lock instruction referenced in the LIE, if the address locations and the values match.

Above, potential embodiments for detection of corresponding lock and lock release instructions defining a critical section (CS) have been discussed. Yet, prediction logic 140 is also to store a prediction entry to represent whether a lock instruction begins a critical section or not, i.e. is to be elided in the future, such as upon a subsequent detection of the lock instruction. Therefore, if comparison logic determines that a subsequent lock release instruction corresponds to a previously detected lock instruction, then prediction logic 140 stores an entry to represent that the lock instruction begins a critical section, defines a critical section, and/or is to be elided in the future in response to detecting the lock instruction again.

For example, assume detection logic 130 detects a lock instruction, storage logic 136 stores a LIE including a reference to the lock instruction, a reference to a first address location associated with the lock instruction, and a value read by the lock instruction from the first address location. Subsequently, detection logic 130 detects a store to a second address location. Comparison logic determines the store is a corresponding lock release instruction, in response to the second address location being the same as the first address location and the value stored in the LIE being the same as the value to be written to the address location by the store. Prediction logic 140 then stores a prediction entry including a reference to the lock instruction and a value representing that the lock instruction begins a critical section. Next, when detection logic 130 detects the lock instruction, by opcode, last instruction pointer, or other reference to the lock instruction, the lock instruction is elided as determined from prediction logic 140.

However, if comparison logic 137 does not determine any subsequent lock release instruction corresponds to the lock instruction, then inversely, prediction logic 140 stores the entry to represent that the lock instruction does not begin a critical section. Here, the instruction is potentially not used as a lock instruction. In one embodiment, after detection of a lock instruction and/or storage of a LIE in storage logic 136, a watchdog timer is used to determine a period within which a subsequent corresponding lock release instruction is to be found. For example, after a LIE referencing a lock instruction is stored in storage logic 136, a timer starts to count. Subsequent store instructions are compared in comparison logic 137. If no corresponding lock release instruction is found in an amount of time, which may determined from the timer expiring, then the prediction entry is to represent that the lock instruction does not begin a critical section, as above. Here, upon subsequent detection of the lock instruction the lock is to executed normally, not elided.

However, using a timer is not the only method to determine when no subsequent corresponding lock release instruction has been detected. For example, a micro-operation count, which counts the number of micro-operations after the lock instruction is detected, is used. Here, if no corresponding lock release instruction is found in a predetermined number of operations after the lock instruction, then it is determined no subsequent corresponding lock release instruction has been found.

Before the prediction logic is populated with entries, or when an entry referencing a detected instruction does not yet exist, there are two default options in how to treat the lock instruction. In a first embodiment, by default, lock instructions are elided. Here, upon detecting a lock instruction, a register checkpoint is created. In other words, the register state at the point of the lock instruction is saved, in case execution has to return to this original state. Next, a store operation to a lock address location is elided, i.e. omitted. In the example above, a logical one was written to a lock address location to lock a hashtable. Here, that store operation is elided. However, in one embodiment, the store is still retained in a store buffer. In addition, the value that was to be written to the lock address location is stored in a lock instruction entry (LIE) in storage logic 136. As an example, that value may be provided to other requesting agents, as well as written to the address location to attempt a late lock acquire, as discussed in more detail below.

Next, as memory accesses after eliding the lock instruction are tentative, i.e. they may be aborted and reset back to the saved register checkpoint state, they are tracked. In one embodiment, there are two additional tracking bits associated with each line of an accessed memory, such as lower level data cache 165. Here, one of the two additional bits is to be set upon a load from an associated line, while the other bit is to be set upon a write to the associated line. As a result, data contention and conflict from other agents, such as other threads, cores, or processors, are detectable. Other methods of tracking tentative memory accesses may be used, such as methods for tracking memory accesses during transactional execution. Tracking memory accesses are discussed in regards to transactional execution in the following co-pending applications: P23157 entitled, "Hardware Acceleration for a Software Transactional Memory System," P23547 entitled, "Global Overflow Method for Virtualized Transactional Memory," P24384 entitled, "A Post-Retire Scheme for Tracking Tentative Accessed During Transactional Execution."

When tracking the tentative memory accesses, if a data conflict does occur, then the current execution is potentially aborted and rolled back to the register checkpoint. For example, assume two threads are executing on processor 100. Thread 0 detects the lock instruction and is tracking accesses in lower level data cache 165. A conflict, such as thread 1 writing to a location loaded from by thread 0, is detected. Here, either thread 0 or thread 1 is aborted, and the other is potentially allowed to execute to completion. If thread 0 is aborted, then in one embodiment, the register state is returned to the register checkpoint and the lock instruction, as well as the subsequently aborted instructions, are re-executed without eliding the lock.

However, assuming tracking the tentative accesses does not detect a data conflict, then comparison logic 137 is still comparing lock release instructions to the lock instruction information stored in storage logic 136. When a corresponding lock release instruction is found, the prediction entry is stored as discussed above. In addition, the tentative memory accesses, which were tracked, are committed, i.e. made globally visible. In the above example, the tracking bits would be cleared back to their default state. Moreover, the store to change the lock value back to an unlock value is elided. Above, a store associated with the lock instruction to set the lock was elided; therefore, the address location of the lock still represents an unlocked state. Consequently, the store associated with the lock release instruction also is elided, since there is potentially no need to re-write an unlock value to a location already storing an unlocked value.

Turning to FIG. 2, an embodiment of storage logic 136 is illustrated. As stated above, storage logic 136 is to store a lock instruction entry (LIE). In one embodiment, an LIE includes a reference to a lock instruction and a reference to an address location associated with the LIE. Here, subsequent address locations associated with potential lock release instructions are compared to the address location stored in the LIE to determine if one of the potential lock release instructions correspond to the referenced lock instruction.

As an illustrative embodiment, LIE 201 includes a plurality of fields, such as lock instruction store physical address (LI Str PA) 205, lock instruction load value 210 and load size 215, lock instruction store value 220 and size 225, micro-operation count 230, release flag 235, late lock acquire flag 240, and last instruction pointer field 245. In one embodiment, storage logic 136 is capable of storing multiple LIEs to support nested critical sections, as discussed below. As an example, a plurality of storage elements, such as registers, are used to logically form storage logic 136 as a data structure, such as an array, stack, or queue.

In one example, upon detecting a lock instruction, LIE 201 is created/stored in storage logic 136. Field 205 is to store a physical address referenced by a store associated with the lock instruction, i.e. an address location that the lock instruction is to write to during execution. Note that field 205, in other embodiments, may store any type of address, such as a virtual address, or any other reference to an address location, such as a tag or hash value. When subsequent stores, i.e. potential lock release instructions, are detected, their referenced addresses are compared to the address loaded from/ stored to by the lock instruction, which is referenced in field 205. Therefore, in one embodiment, a detected lock release instruction's referenced address is compared against all referenced addresses in LIEs, 201, 250, 260, 270, and 280 to determine if the lock release instruction corresponds to any of the LIEs in storage logic 136.

Fields 210 and 215 are to store a value, and a size of the value, to be loaded by the lock instruction, respectively. As stated above, memory operations typically associated with a lock instruction include a load/read from a memory location and a store back to the memory location with a lock value. Here, the physical address of the address location is stored in field 205, as above, and the value read from the address location referenced by the load associated with the lock instruction is stored in field 210. The size of the load value is potentially stored in field 215. In an embodiment where comparison logic includes address comparison and value comparison, the value of field 210 is used to compare against a value to be stored by a potential lock release instruction. If the values match, i.e. the lock release instruction is attempting to write the same unlock value read by the lock instruction initially, then it is determined that the lock release instruction corresponds to the lock instruction referenced by LIE 201.

In addition to the value read by the lock instruction, the value to be stored to the address location by the lock instruction, i.e. the value to acquire the lock, is stored in field 220, and the size of that value is potentially stored in field 225. In one embodiment, the store value of the lock instruction is held to forward to subsequent loads within a critical section. For example, a programmer may assert that the lock value is held within a critical section. However, if the store to the lock value was elided, the lock value, globally, still represents the lock is available. As a result, the value in field 220 is forwarded to represent locally that the lock is acquired.

LIE 201 also includes release flag 235. In a first state, release flag 235 represents that no corresponding lock release instruction has been found. Alternatively, in another state release flag 235 represents that a corresponding lock release instruction has been found. Therefore, lock release flag 235 is potentially utilized for a number of reasons. First, where a watchdog timer is used, upon the watchdog timer expiring, lock release flag 235 is checked to determine if a corresponding lock release instruction has been found.

Second, release flag 235 is used to track if a corresponding lock release instruction has been found. Therefore, in one embodiment, storage logic 136 is logically viewable as a stack of N LIE entries. As a result, multiple lock instructions are able to be tracked, which potentially supports nested critical sections. To illustrate, assume a first lock instruction is encountered to begin a first critical section, and then a second lock instruction is encountered to begin a second critical section nested within the first critical section. In a stack configuration, LIE 250 is associated with the first lock instruction and is pushed on the stack before LIE 201, and LIE 201 is associated with the second lock instruction and is pushed on the top of the stack.

However, programmers potentially release locks in any order. Therefore, instead of releasing a second lock associated with LIE 201 and then releasing a first lock associated with LIE 250, programmers may release the first lock associated with LIE 250 before the second lock associated with lie 201. As a result, when the lock release is found for LIE 250, LIE 250 may not be popped off the stack, since a corresponding lock release for LIE 201 has not been found.

Therefore, in one embodiment, the lock release instruction is compared to all of the entries of the stack, i.e. referenced addresses and/or values are compared as discussed above for all the entries. When a lock release instruction corresponding to the first lock instruction associated with entry 250 is detected first, release flag 235 is set, but entry 250 is not popped, as it is not at the top of the stack. Later, when entry 201 is popped from the stack, the release flag field in entry 250 is checked. Here, the release flag field in entry 250 represents a corresponding lock release instruction was found, and entry 250 may now be popped off the stack accordingly.

Referring back to LIE 201, a timer value field 230 is also illustrated. In one embodiment, field 230 is to store a value representing an amount of time allowed to search for a corresponding lock release instruction. For example, a lock instruction is detected and LIE 201 is created/stored. After detecting the lock instruction or after storing LIE 201, a watchdog timer counts down from the timer value in field 230. The timer value may be stored in a register that is user-addressable or set by the system. In another embodiment, the timer is set to a predetermined value, which is not based on a value stored in LIE 201.

In another embodiment, field 230 is to store an operation count. Here, instead of an amount of time, a watchdog timer/counter counts the number of operations or micro-operations executed after detecting a lock instruction. When a predetermined number of operations are executed, the counter/timer is said to have expired.

If a lock release instruction is found before the watchdog timer expires, then release flag 235 is set, LIE 201 is popped off the top of the stack, and a prediction entry is stored in prediction logic to represent the lock instruction associated with LIE 201 begins a critical section, i.e. is to be elided upon subsequent detection. Prediction logic and prediction entries are discussed in more detail below in reference to FIGS. 3-4. Alternatively, if no corresponding lock release instruction is found before the watchdog timer expires, then a prediction entry is stored in prediction logic to represent the lock instruction associated with LIE 201 does not begin a critical section, i.e. is not to be elided upon subsequent detection.

In addition, in one embodiment, after the watchdog timer expires without finding a corresponding lock release instruction a late lock acquire is attempted. In one example, late lock flag 240 is set to represent that a late lock acquire is being attempted. Here, a lock instruction is elided, but within the allotted watchdog time, no corresponding lock release instruction is found. As a result, the lock that was previously elided is attempted later, which potentially includes reading the lock location and writing a value to the lock location to acquire the lock. If the read and store of the lock instruction succeed, then execution is completed successfully. In another embodiment, late lock acquire flag 240 is not set upon the attempt to acquire the lock, but rather is set upon successfully acquiring the lock late to represent entry 201 is associated with late lock execution.

If the late lack acquire does not succeed, such as when another resource has acquired the lock and the late lock acquire attempt spins on the lock, then tentative memory accesses tracked after the lock instruction are re-executed. In one embodiment, the register state is returned to a checkpoint stored at the lock instruction, the lock instruction is re-executed without elision, and the subsequent instructions in program order after the lock instruction are re-executed, i.e. the tracked accesses.

In one embodiment, a late lock acquire is also attempted if, while tracking tentative accesses, resources are limited. For example, a lock instruction is detected and elided. Subsequent tentative memory accesses are tracked in a lower-level data cache. Yet, the tentative accesses in the critical section become too big for the data cache to track, i.e. space in the data cache runs out. Next, as above, a late lock acquire is attempted. In another embodiment, when resources become limited the tracking of tentative accesses is virtualized, as discussed in co-pending application P23547 entitled, "Global Overflow Method for Virtualized Transactional Memory."

LIE 201 also includes a reference to an associated lock instruction, such as Last Instruction Pointer (LIP) 245. Any LIP reference is potentially stored in field 245, and used to identify a lock instruction in a prediction entry, as discussed below. Other examples of a reference to a lock instruction include an opcode or other identifier. Furthermore, manipulations of an LIP with other information are possible. In one embodiment, branch prediction/history information is combined/hashed with the LIP through a logical operation and stored in field 245.

Figure 3:
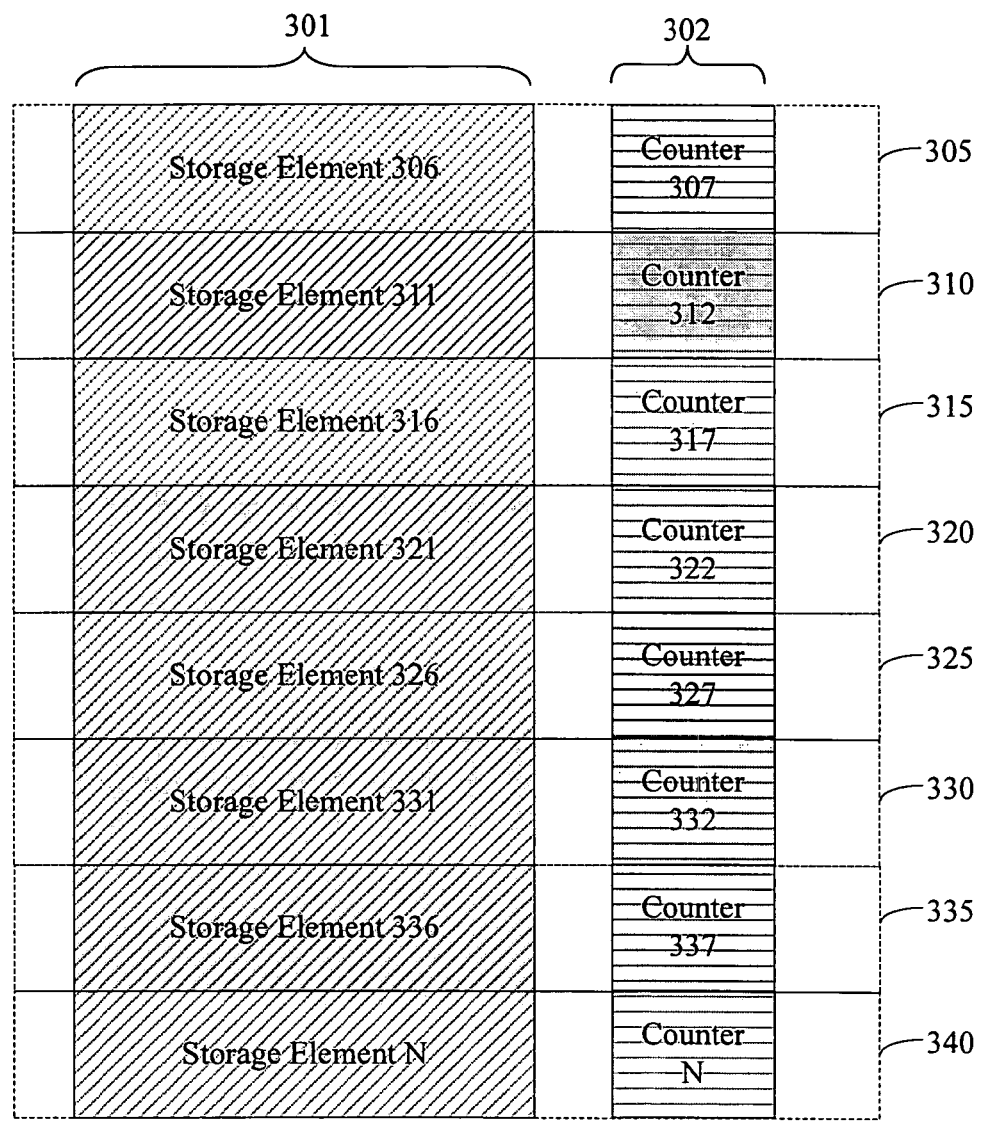
FIG. 3 illustrates an embodiment of critical section prediction logic to store prediction entries.

Turning to FIG. 3, an embodiment of prediction logic 140 is illustrated. Prediction logic 140 is to store a prediction entry associated with a lock instruction. In one embodiment, prediction logic has an even number of entries, such as 128, but the number of entries is not so limited. The prediction entry is to represent if a lock instruction begins a critical section, i.e. is to be elided upon detection. Therefore, in one embodiment, prediction logic 140 stores a reference to a lock instruction, such as a last instruction pointer (LIP), and an associated value to represent whether the associated instruction is to be elided upon detection.

In one embodiment, prediction logic 140 includes array of storage elements 301, i.e. storage elements 306, 311, 316, 321, 326, 331, 336, and N, as well as array of counters 307, 312, 317, 322, 327, 332, 337, and N. Each of the counters is associated with a storage element, such as counter 307 and storage element 306, to form entry 305. Storage element 306 is to store the reference to the lock instruction. In one embodiment, the reference to the lock instruction is the same reference stored in field 245 of storage logic 136. Examples of a reference to a lock instruction include an LIP, an LIP hashed with branch history/prediction information, an opcode associated with an address, a physical/virtual address of an instruction location, and any other method of referencing an instruction.

Initially, prediction logic 140, including entries 305, 310, 315, 320, 325, 330, 335, and 340, are not populated. Therefore, in one embodiment, when lock instructions are encountered for the first time, the lock instructions are, by default, elided. As discussed above, a register checkpoint is created, a store associated with the lock instruction is not performed, and memory accesses are tracked. Alternatively, when lock instructions are encountered for the first time, they are executed without elision, but tracked to see if a corresponding lock release instruction is found.

After a lock instruction is detected, a LIE in storage logic 136 from FIG. 1 is created. If a corresponding lock release instruction is found as determined by comparison logic 137 and/or denoted by release flag 235, then prediction logic 140 stores prediction entry 305 to represent that the lock instruction is to be elided upon subsequent detection. Here, storage element 306 stores an LIP referencing the lock instruction and counter 307 is set to a first value, such as a predetermined integer, to represent the lock instruction begins a critical section. Conversely, if a watchdog timer expires and no corresponding lock release instruction has been found, prediction logic 140 stores prediction entry 305 to represent that the lock instruction is not to be elided upon subsequent detection. In that case, counter 307 is set to a second value, such as any other value than the first value, to represent that the lock instruction does not begin a critical section.

As an illustrative example referring to FIGS. 1-3, assume a first lock instruction, which is referenced by a first LIP, is detected. Storage logic 136 creates LIE 201 including field 245 to store the first LIP, field 205 to store a first address location loaded by the first lock instruction, and field 210 to store the value loaded by the lock instruction. A watchdog timer begins to count upon creating LIE 201. A potential subsequent lock release instruction is detected. The address locations and values of the lock instruction and the lock release instruction are compared and match. Prediction logic 140 stores/creates prediction entry 305 including storage element 306 to store the first LIP and counter 307, which in this example is a 2-bit counter, is set to a predetermined value of three to represent the first lock instruction is to be elided upon subsequent detection. LIE 201 is popped from the stack and execution continues.

Subsequently, another lock instruction referenced by the first LIP is detected. Prediction logic 240 is checked, and it is determined from entry 305, that the lock instruction is to be elided, i.e. counter 307 represents a value of three. Therefore, LIE 201 is created as before and a watchdog timer begins to count. However, this time a corresponding lock release instruction is not detected before the watchdog timer expires. As a result, prediction entry 305 is updated/created/stored to represent that the lock instruction is not to be elided, i.e. counter 307 is decremented to two. In this example, counter 307 having a value of three represents that a lock instruction referenced by the LIP in storage element 306 is to be elided, while any other number, such as 0, 1, or 2, represents that the lock instruction is not to be elided. Furthermore, anytime a corresponding lock instruction is found, counter 307 is incremented up to the predetermined value of three, and anytime a corresponding lock instruction is not found, the counter is decremented. Note that values of 0, 1, and 2 may represent the lock is to be elided, while 3 is to represent the lock is not to be elided based on the design implementation. Furthermore, any values, identifiers, and/or lock instruction references may be used in prediction logic 140.

Figure 4:
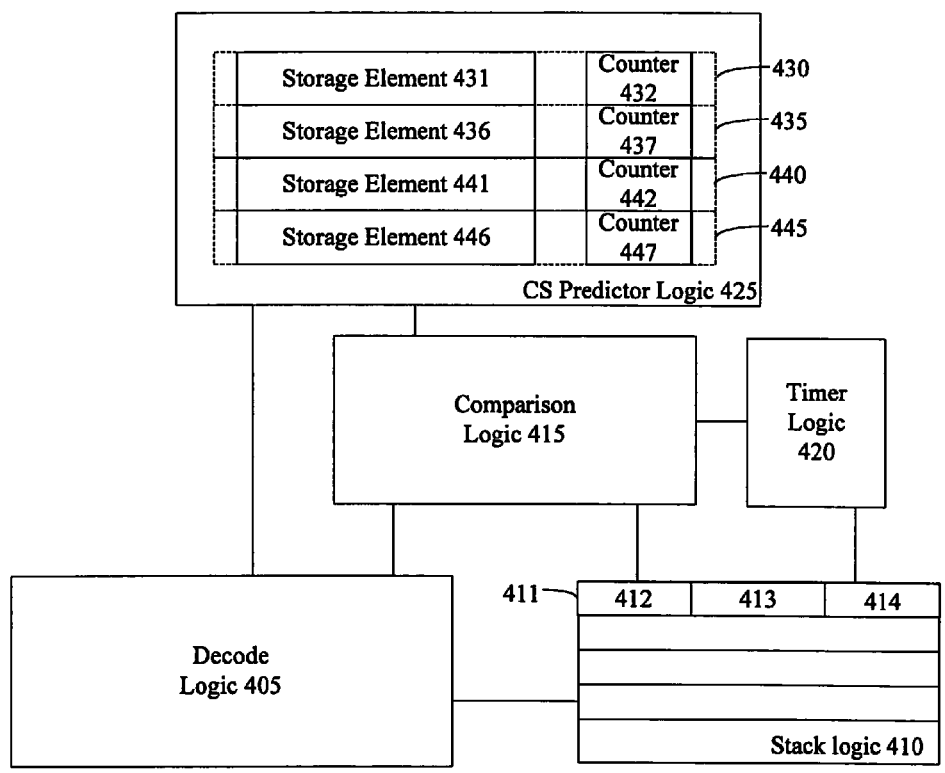
FIG. 4 illustrates an embodiment of logic capable of detecting and predicting critical sections.

Turning to FIG. 4, an embodiment of logic capable of detecting and predicting critical sections is illustrated. In one embodiment, logic 400 is present in a microprocessor, where decode logic 405 is part of the microprocessor's instruction pipeline. Decode logic 405 is capable of detecting lock instructions and lock release instructions. In one embodiment, lock and lock release instructions are detected by opcodes identifying predetermined instructions, such as a CMPXCHG, a BTS, a XADD, and a store instruction, as discussed above. In another embodiment, lock instructions are detected by read, modify, and store memory operations associated with an instruction, while lock release instructions are detected by a store operation associated with an instruction.

Stack 410 is to store lock instruction entries associated with lock instructions detected by decode logic 405. In one embodiment, a lock instruction entry (LIE), such as LIE 411, includes address 412 of a location loaded from or to be written to by the lock instruction, value 413 to be written by the lock instruction, and reference to the lock instruction 414, such as an LIP referencing an associated lock instruction. Timer logic 420 is to count after detecting a lock instruction or storing LIE 411 associated with the lock instruction.

Comparison logic 415 includes address comparison logic to compare address 412 with addresses referenced by potential lock release instructions detected by decode logic 405. In one embodiment, comparison logic 415 also includes value comparison logic to compare value 413 with a value to be written by potential lock release instructions. Here, a lock release instruction corresponds to the lock instruction referenced by LIP 414, if the addresses and values match.

If a corresponding lock release instruction is found before timer logic 420 expires, then a prediction entry, such as entry 430 is stored/created in critical section (CS) predictor logic 425 to represent the lock instruction referenced by LIP 414 is to be elided upon subsequent detection. Here, storage element 431 stores LIP 414 and counter 432 is set to a value, such as the integer three, to represent a lock instruction referenced by LIP 414 begins a critical section and is to be elided.

However, if timer logic 420 expires without finding a corresponding lock instruction, then entry 430 is stored/created/modified to represent that an instruction referenced by LIP 414 does not begin a critical section and is not to be elided upon detection. As an example, if lock entry 430 is previously created with counter 432, then counter 432 is decremented. Here, if counter 432 was previously set to a value of three to represent the LIP stored in storage element 431 is to be elided, then counter 432 is decremented to two to represent that the LIP is not to be elided upon subsequent detection.

Figure 5A:
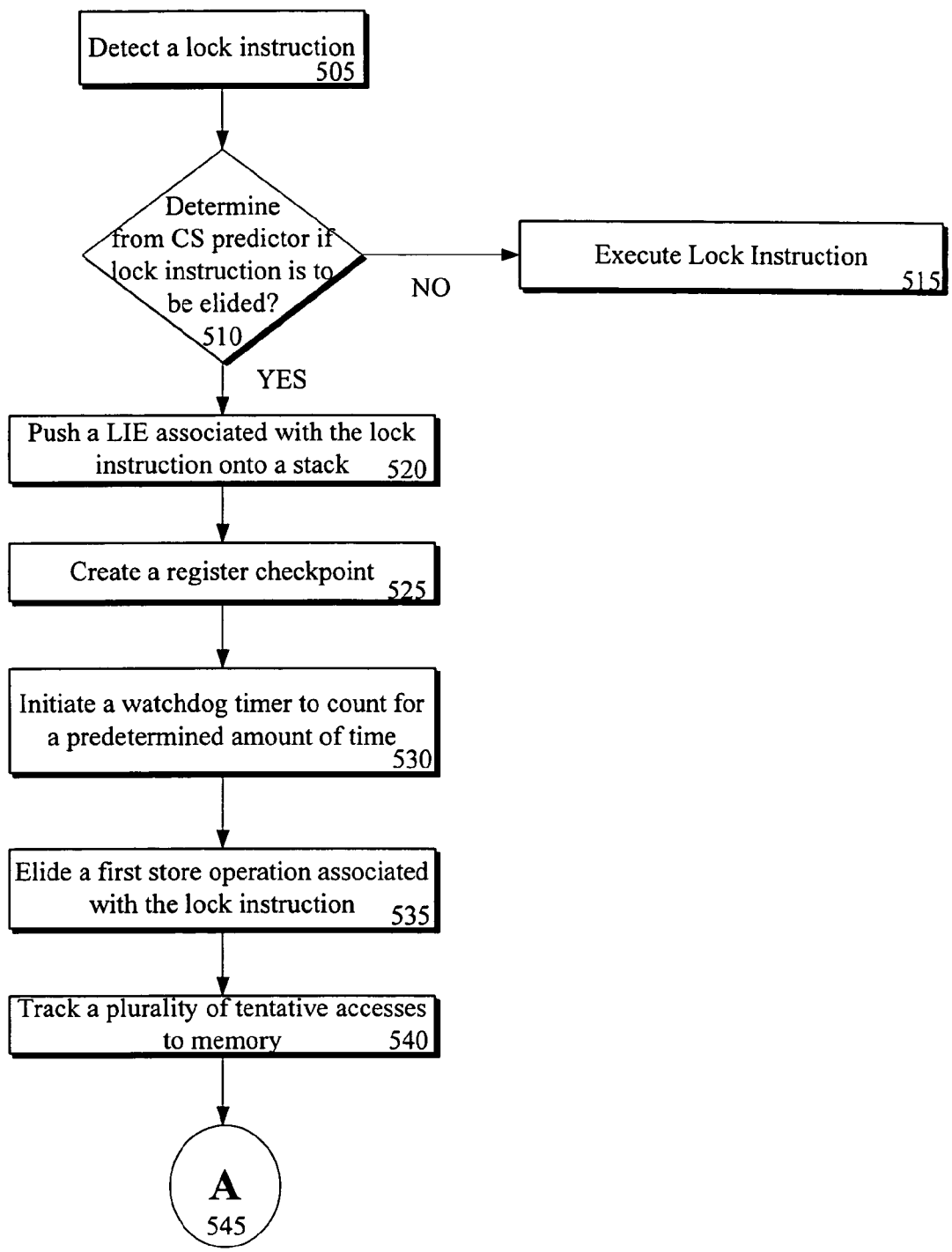
Figure 5B:
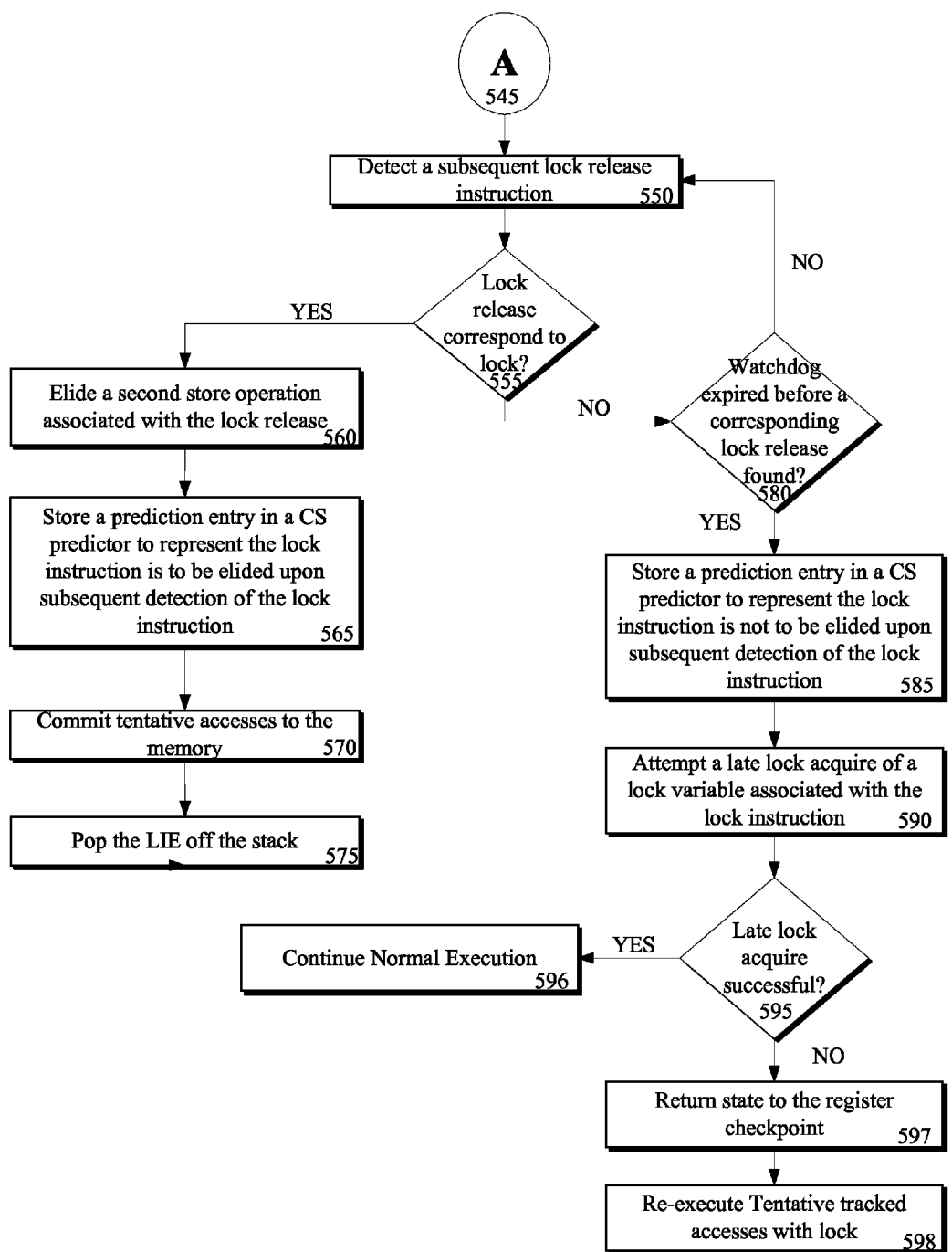

Referring next to both FIGS. 5a and 5b an embodiment of a flow diagram for predicting critical sections and eliding lock instructions predicted to begin critical sections is illustrated. Although, the flow between 505 and 598 is illustrated in a somewhat linear fashion, the flow is not so limited. For example, flow 575, i.e. popping the LIE off the stack, potentially occurs before flow 570, i.e. committing tentative accesses, and/or flow 565, storing a prediction entry. Similarly, as another example, a register checkpoint in flow 525 may be created before a LIE is pushed onto a stack in flow 520, and a watchdog timer in flow 530 may be initiated immediately after detecting a lock instruction in flow 505, between flow 520 and 525, or before flow 540.

In flow 505, a lock instruction is detected. As above, detection of a lock instruction may be by predetermined pattern representing a specific instruction, as well as specific memory operations, such as read, write, and modify operations, associated with an instruction. In flow 510, it is determined from a Critical Section (CS) predictor, if a lock instruction detected in flow 505, is to be elided.

As an example, in FIG. 3, an LIP referencing the detected instruction is compared against LIP's in array 301 to determine if an entry is present. Any search algorithm, such as a list search, a binary search, a tree search, or other known search method may be used. If an entry with the LIP is found, the associated counter is checked. If the counter has a first value the lock instruction is to be elided. Inversely, if the counter is set to a second value, the lock is to be executed normally in flow 515.

After flow 515, the lock instruction is still potentially tracked and lock release instructions are potentially still detected and compared to update a critical section predictor. Here, after flow 515, the flow potentially passes through flow 520, 530, 545, 550, 555, 565, 575, 580, and 585. As a result, the CS predictor is updated, even though, the lock instruction was not elided. In this example, the flows associated with eliding the lock instruction and late lock acquire, such as flows 525, 535, 540, 560, 570, 590, 595, 596, 597, and 598 where not included after flow 515, since the lock instruction is not elided.

Above, it is assumed that an entry relating to the detected lock instruction is found in the CS predictor, whether the associated counter represents a first or second value. However, an entry may not be found in the CS predictor, such as during early system execution when the CS predictor is not populated. In one embodiment, where an entry is not found in the CS predictor, by default, the lock is executed normally through flow 515, as discussed above. Alternatively, as discussed below in continuation of the example, where an entry is not found, by default, the lock instruction is elided.

Continuing, in flow 520, whether it was determined that the lock instruction is to be elided or by default the lock instruction is to be elided, a lock instruction entry associated with the detected lock instruction is pushed onto a stack. In one embodiment, the stack is a plurality of registers logically viewed as a stack. Note that any number of entries are potentially supported by the stack. Furthermore, other entries associated with subsequent lock instructions are potentially pushed onto the stack above the LIE associated with the detected instruction. The LIE potentially includes any combination of the following: an address loaded from by the lock instruction, a first value loaded from the address by the lock instruction, a size of the first value, a second value to be written to the address by the lock instruction, the size of the second value, a timer value, a micro-operation count, a lock release instruction found flag, a late lock acquire flag, a reference to the lock instruction, a lock instruction pointer (LIP) referencing the lock instruction, and any other lock elision or critical section prediction related field.

In flow 525, a register checkpoint is created. Essentially, the register state of the processing resource or registers to be affected are stored in a secondary space in case execution is to restart from the register "checkpoint." In flow 530 a watchdog timer to count for a predetermined amount of time is initiated. In one embodiment, the watchdog timer is initiated in response to the LIE being pushed on the stack. Here, the predetermined value, or micro-operation count, is potentially stored in the LIE. The watchdog timer reads the value and counts down from the predetermined value, whether it be a time value or a micro-operation value. In another embodiment, the watchdog timer begins to count upon detection of the lock instruction. Here, the timer logic includes a predetermined set time or micro-operation count to count down from.

A first store operation associated with the lock instruction is elided in flow 535. As stated above, a lock instruction typically includes a load, a modify, and a store memory operation. In eliding the lock, the modify and store operation, i.e. the locking of the lock value, is omitted. In other words, the lock instruction is converted into a simple load instruction.

However, as no lock is acquired to ensure exclusive access to memory locations, subsequent accesses are tracked in flow 540. As discussed above, a data cache or other memory is potentially used to track tentative memory accesses. As an example, two bits in a first level-data cache are added to each line of the cache to track loads and stores, respectively. The extra bits are utilized to detect and resolve data conflicts. The following applications discuss use of bit to track tentative memory accesses: P23157 entitled, "Hardware Acceleration for a Software Transactional Memory System," P23547 entitled, "Global Overflow Method for Virtualized Transactional Memory," P24384 entitled, "A Post-Retire Scheme for Tracking Tentative Accessed During Transactional Execution."

The flow is continued in FIG. 5b through flow connector 545, i.e. A. Here, a subsequent lock release instruction is detected in flow 550. As above, predetermined instructions are potentially targeted. In another embodiment, all stores are considered potential lock release instructions, since a store of an unlock value to a lock address releases the lock.

Therefore, in flow 555, it is determined if the lock release instruction corresponds to the lock release instruction. In one embodiment, the address referenced by the lock release instruction is first compared to all of the entries in the stack, to see if the lock release instruction corresponds to any previously detected lock instruction. If a lock release instruction does correspond to an entry, a lock release found flag is set in the entry. In another embodiment, if the addresses match, the value to be written by the lock release instruction is compared to the value loaded by the lock instruction, which is stored in the LIE. In this example, if the addresses and values match, then it is determined that the lock release instruction corresponds to the lock instruction and the lock release instruction found flag is set.

If the lock release instruction corresponds to the lock instruction, then in flow 560, a second store operation associated with the lock release is elided. In flow 535, the lock instruction is converted to a load and the store to set the lock value was omitted. As a result, the store of the lock release is potentially redundant and omitted as well, since the address location is still set to the unlock value.

In flow 565, a prediction entry in a CS predictor is stored/set/modified to represent the lock instruction is to be elided upon subsequent detection of the lock instruction. In one embodiment, an LIP stored in the LIE referencing the lock instruction is stored in the prediction entry and is associated with a value to represent a subsequent detection of the LIP is to result in elision of the lock instruction referenced by the LIP.

In addition, as the memory accesses in the critical section are tentative and being tracked, they are now committed in flow 570, as long as no data conflicts were detected during tracking or the data conflicts that were detected were resolved without an abort/restart. In flow 575, the lock instruction entry is popped from the stack. Here, it is assumed that the LIE is at the top of the stack. However, if the LIE is not at the top of the stack, then the lock release found flag is set either in flow 555 or 575. Later, when a corresponding lock release instruction is found for entries above the LIE and those entries are popped off, the LIE is popped off the stack in response to the lock release instruction found flag being set.

Returning to flow 555, if it is determined the lock release instruction does not correspond to the lock instruction, then in flow 580 it is determined if the watchdog timer has expired. If the timer has not expired, flow returns to 550 to detect another subsequent lock release instruction. Note that in one embodiment, the watchdog timer is not checked and flow 580 does not exist. Here, in flow 545, 550, or 555, if the watchdog timer expires, it is treated as an interrupt like event directing the flow to flow 585, if a corresponding lock release instruction has not been found.

In flow 585, a CS predictor entry in the CS predictor logic is stored/created/modified to represent the lock instruction is not to be elided upon subsequent detection of the lock instruction. Continuing the example, the LIP referencing the lock instruction is stored in the prediction entry and associated with a second value to represent a subsequent lock instruction referenced by the LIP is not to be elided. Note that if an entry is already created for the LIP, that entry is potentially updated by altering the value associated with the LIP to the second value. Altering and modifying an existing entry is also referred to as storing or creating an entry.

After the watchdog timer expires without finding a lock release corresponding to a lock instruction in flow 555, a late lock acquire is attempted. In this case, it was predicted that the lock instruction started a critical section; therefore, the lock was elided and execution continued without acquiring the lock to allow simultaneous access to data tables by other processing resources. However, if no corresponding lock release instruction is found, then it is assumed that there was no critical section. As a result, the lock should have been normally executed. At this point the execution of the critical section may be aborted and returned to the register checkpoint of flow 525 or, in another embodiment, a late lot acquire of the lock variable is attempted in flow 590.

As an example, the lock instruction is essentially re-executed to read, modify, and write to the lock variable location to acquire the lock. If the lock acquire is successful, then in flow 596 normal execution continues. However, if the late lock acquire is not successful, as in the case where the lock instruction spins on the lock, i.e. the load of the lock instruction reads a locked value, then the state is returned to the register checkpoint of flow 525 and the subsequent instructions that resulted in the tentatively tracked accesses are re-executed through flow 515, i.e. using the traditional lock.

As illustrated above, critical sections are potentially detectable through finding corresponding silent pairs of lock and lock release instructions. Instead of performing erroneous elision of a lock instruction that does not begin a critical section, prediction logic stores a prediction of whether lock instructions begin a critical section. Consequently, a system is able to efficiently tune itself to elide lock instructions that define a critical section, while potentially avoiding the adverse impact of wasting execution cycles by eliding locks that do not define a critical section.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   detecting a read modify write (RMW) lock instruction, which references a first address location;
   pushing a lock instruction entry (LIE) associated with the lock instruction onto a lock stack in response to detecting the lock instruction, wherein the LIE includes a lock address referenced by the RMW lock instruction and a lock value to be written to the lock address by the RMW lock instruction;
   attempting to find a subsequent lock release instruction that corresponds to the RMW lock instruction;
   attempting a late-lock acquire in response to not finding the subsequent lock release instruction that corresponds to the RMW lock instruction before a time out; and
   storing a prediction entry in a critical section predictor to represent the lock instruction is to be elided in response to finding the subsequent lock release instruction that corresponds to the RMW lock instruction before the time out.

2. The method of claim 1, further comprising:
   popping the LIE associated with the lock instruction off the stack in response to finding the subsequent lock release instruction that corresponds to the lock instruction and the LIE associated with the lock instruction is on top of the stack; and
   setting a found corresponding lock release instruction flag in the LIE and popping the LIE off the stack after at least one other LIE is popped from the stack in response to finding the subsequent lock release instruction that corresponds to the lock instruction and the LIE associated with the lock instruction is not on top of the stack.

3. The method of claim 2, further comprising:
   initiating a watchdog timer to count for a predetermined amount of time, in response to pushing the entry onto the stack; and
   determining the subsequent lock instruction is not found in response to the watchdog timer expiring before finding a subsequent lock release instruction that corresponds to the lock instruction; and
   storing an entry in the critical section predictor to represent the lock instruction is not to be elided in response to subsequently detecting the lock instruction in response to determining the subsequent lock instruction is not found.

4. The method of claim 3, further comprising:
   tracking a plurality of tentative accesses to a memory subsequent in program order to the lock instruction, in response to detecting the lock instruction;
   committing the tentative accesses to the memory in response to finding the subsequent lock release instruction that corresponds to the lock instruction before the time out.

5. The method of claim 4, further comprising:
   checking the critical section predictor in response to subsequently detecting the lock instruction; and
   eliding the lock instruction in response to the entry in the critical section predictor representing the lock instruction is to be elided.

6. The method of claim 5, wherein eliding the lock instruction comprises:
   creating a register checkpoint in response to subsequently detecting the lock instruction;

eliding a first store operation to an address location associated with the subsequently detected lock instruction;
tracking a plurality of tentative memory accesses subsequent in program order to the subsequently detected lock instruction.

7. An apparatus comprising:
means for: detecting a read modify write (RMW) lock instruction, which references a first address location; pushing a lock instruction entry (LIE) associated with the lock instruction onto a lock stack in response to detecting the lock instruction, wherein the LIE includes a lock address referenced by the RMW lock instruction and a lock value to be written to the lock address by the RMW lock instruction; attempting to find a subsequent lock release instruction that corresponds to the RMW lock instruction; attempting a late-lock acquire in response to not finding the subsequent lock release instruction that corresponds to the RMW lock instruction before a time out; and storing a prediction entry in a critical section predictor to represent the lock instruction is to be elided in response to finding the subsequent lock release instruction that corresponds to the RMW lock instruction before the time out.

8. The apparatus of claim 7, further comprising:
means for: popping the LIE associated with the lock instruction off the stack in response to finding the subsequent lock release instruction that corresponds to the lock instruction and the LIE associated with the lock instruction is on top of the stack; and setting a found corresponding lock release instruction flag in the LIE and popping the LIE off the stack after at least one other LIE is popped from the stack in response to finding the subsequent lock release instruction that corresponds to the lock instruction and the LIE associated with the lock instruction is not on top of the stack.

9. The apparatus of claim 8, further comprising:
means for initiating a watchdog timer to count for a predetermined amount of time, in response to pushing the entry onto the stack; and determining the subsequent lock instruction is not found in response to the watchdog timer expiring before finding a subsequent lock release instruction that corresponds to the lock instruction; and storing an entry in the critical section predictor to represent the lock instruction is not to be elided in response to subsequently detecting the lock instruction in response to determining the subsequent lock instruction is not found.

10. The apparatus of claim 9, further comprising:
means for tracking a plurality of tentative accesses to a memory subsequent in program order to the lock instruction, in response to detecting the lock instruction; committing the tentative accesses to the memory in response to finding the subsequent lock release instruction that corresponds to the lock instruction before the time out.

11. The apparatus of claim 10, further comprising:
means for checking the critical section predictor in response to subsequently detecting the lock instruction; and eliding the lock instruction in response to the entry in the critical section predictor representing the lock instruction is to be elided.

12. The apparatus of claim 11, wherein eliding the lock instruction comprises:
means for creating a register checkpoint in response to subsequently detecting the lock instruction; eliding a first store operation to an address location associated with the subsequently detected lock instruction; tracking a plurality of tentative memory accesses subsequent in program order to the subsequently detected lock instruction.

* * * * *